(12) United States Patent
Richter et al.

(10) Patent No.: US 10,363,792 B2
(45) Date of Patent: Jul. 30, 2019

(54) AIR-CONDITIONING SYSTEM FOR COOLING AND DRYING AIR IN PASSENGER COMPARTMENT OF VEHICLE

(71) Applicant: Hanon Systems, Daejeon (KR)

(72) Inventors: Gerald Richter, Aachen (DE); Marc Graaf, Krefeld (DE); Julia Roeb, Cologne (DE); Toni Spies, Cologne (DE)

(73) Assignee: HANON SYSTEMS, Daejeon (KR)

( * ) Notice: Subject to any disclaimer, the term of this patent is extended or adjusted under 35 U.S.C. 154(b) by 11 days.

(21) Appl. No.: 15/506,025

(22) PCT Filed: Oct. 23, 2015

(86) PCT No.: PCT/KR2015/011260
§ 371 (c)(1),
(2) Date: Feb. 23, 2017

(87) PCT Pub. No.: WO2016/064238
PCT Pub. Date: Apr. 28, 2016

(65) Prior Publication Data
US 2017/0299232 A1    Oct. 19, 2017

(30) Foreign Application Priority Data

Oct. 24, 2014 (DE) .......................... 10 2014 115 498
Oct. 21, 2015 (DE) .......................... 10 2015 117 964

(51) Int. Cl.
*B60H 1/00* (2006.01)

(52) U.S. Cl.
CPC ..... *B60H 1/00057* (2013.01); *B60H 1/00899* (2013.01); *B60H 2001/00178* (2013.01)

(58) Field of Classification Search
CPC . F25B 13/00; F24F 3/14; F24F 1/0011; F24F 2003/114; F24F 13/04;
(Continued)

(56) References Cited

U.S. PATENT DOCUMENTS 4,125,150 A * 11/1978 Zelger ................ B60H 1/00064
165/42
5,782,102 A * 7/1998 Iritani ................ B60H 1/00021
62/197

(Continued)

FOREIGN PATENT DOCUMENTS

DE    102011052752 A1    2/2013
DE    102012108891 A1    3/2014
(Continued)

*Primary Examiner* — Jianying C Atkisson
*Assistant Examiner* — Tavia Sullens
(74) *Attorney, Agent, or Firm* — Shumaker, Loop & Kendrick, LLP; James D. Miller

(57) ABSTRACT

An air-conditioning system for conditioning air in a vehicle passenger compartment is configured to operate in a cooling system mode for cooling air to be supplied to the passenger compartment and in a heat pump mode for heating the same, and to operate in a reheating mode. The air-conditioning system includes a housing having a first flow channel and a second flow channel for guiding air to an air distribution system having discharge ports communicating with the passenger compartment, and a refrigerant circulation system having at least two heat exchangers. In this case, the first heat exchanger that operates as an evaporator regardless of operating modes is disposed in the first flow channel, and the second heat exchanger that operates as a condenser/gas cooler regardless of operating modes is disposed in the second flow channel.

9 Claims, 3 Drawing Sheets

(58) Field of Classification Search
CPC .............. B60H 1/0005; B60H 1/00057; B60H 1/00064; B60H 1/00842; B60H 2001/00135; B60H 2001/00142; B60H 2001/0015; B60H 2001/00164; B60H 1/00071; B60H 1/00564; B60H 1/00021; B60H 2001/00121; B60H 2001/00185
USPC ............................................ 62/115; 454/121
See application file for complete search history.

(56) References Cited

U.S. PATENT DOCUMENTS

| | | | | |
|---|---|---|---|---|
| 8,408,980 | B2* | 4/2013 | Nanaumi | B60H 1/00564 454/121 |
| 2008/0085672 | A1* | 4/2008 | Creed | B60H 1/00207 454/69 |
| 2011/0009043 | A1* | 1/2011 | Nanaumi | B60H 1/00564 454/121 |
| 2013/0042637 | A1* | 2/2013 | Richter | B60H 1/00057 62/79 |
| 2013/0333406 | A1* | 12/2013 | Takahashi | B60H 1/00921 62/238.7 |
| 2014/0069123 | A1* | 3/2014 | Kim | F25B 5/04 62/61 |

FOREIGN PATENT DOCUMENTS

| | | |
|---|---|---|
| FR | 2743027 A1 | 7/1997 |
| JP | 1058950 | 3/1998 |
| JP | H1191333 A | 4/1999 |
| JP | 2011016523 A | 1/2011 |
| JP | 2013063766 A | 4/2013 |
| KR | 1020050104114 A | 11/2005 |
| KR | 1020070059406 A | 6/2007 |
| KR | 1020070081274 A | 8/2007 |

* cited by examiner

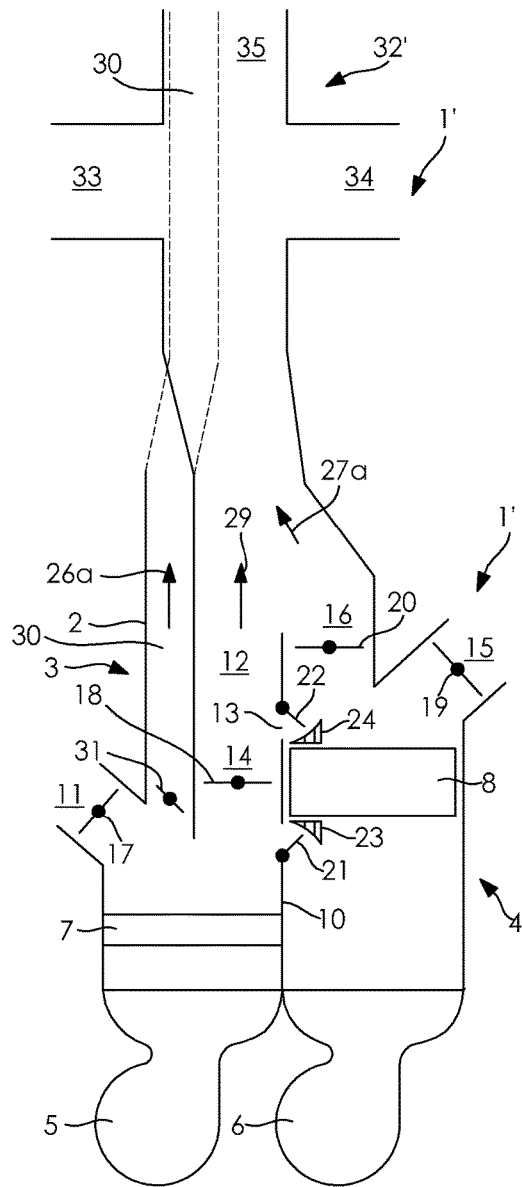
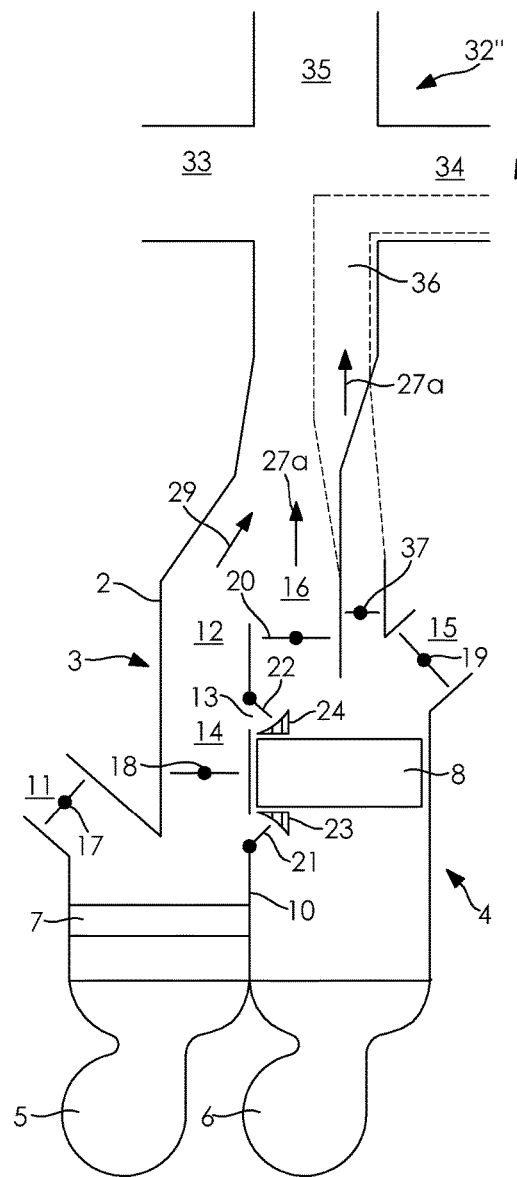
FIG. 2B
FIG. 3

ups

AIR-CONDITIONING SYSTEM FOR COOLING AND DRYING AIR IN PASSENGER COMPARTMENT OF VEHICLE

CROSS-REFERENCE TO RELATED PATENT APPLICATIONS

This patent application is a United States national phase patent application based on PCT/KR2015/011260 filed Oct. 23, 2015, which claims the benefit of German Patent Application No. 10-2015-117964.4 filed Oct. 21, 2015 and German Patent Application No. 10-2014-115498.3 filed Oct. 24, 2014, the disclosures of which are hereby incorporated herein by reference in their entirety.

TECHNICAL FIELD

The present invention relates to an air-conditioning system for conditioning air in a vehicle passenger compartment. The air-conditioning system is configured to operate in a cooling system mode for cooling air to be supplied to the passenger compartment and in a heat pump mode for heating the same, and to operate in a reheating mode. The air-conditioning system includes a housing having first and second flow channels for guiding air to an air distribution system having discharge ports communicating with the passenger compartment, and a refrigerant circulation system having at least two heat exchangers. In this case, a first heat exchanger, which operates as an evaporator regardless of the operating mode, is disposed in the first flow channel, and a second heat exchanger, which operates as a condenser regardless of the operating mode, is disposed in the second flow channel. The present invention also relates to a method of operating the air-conditioning system.

BACKGROUND ART

Air-conditioning systems for vehicles, configured to operate in both a cooling system mode and a heat pump mode for heating, cooling, and dehumidifying air which will be supplied to a passenger compartment and be conditioned therein, are known in the related art. Such air conditioners are controlled at the refrigerant circulation system side or air side thereof.

Conventional air side-controlled compact air-conditioning systems having heat pump functions include a structurally simple refrigerant circulation system which has an evaporator, a compressor, a condenser/gas cooler, and an expansion member. In this case, the evaporator is operated as an evaporator in both a cooling system mode and a heat pump mode, and the condenser is also operated as a condenser in both the cooling system mode and the heat pump mode. In this regard, heat flows are completely controlled through air-side flow control. Heating, cooling, and dehumidification functions allow air, which will be supplied to a passenger compartment, to be provided at any mixing temperature by interconnecting the air sides of air-conditioning systems so as to be suitable for the purpose. In this case, the air flow, which excessively flows in the condenser, as a hot-air flow may be mixed, as needed, with the air flow, which excessively flows in the evaporator, as a cold-air flow, so as to be adapted for a required blowing air temperature. The mixed air flow is guided to the passenger compartment through flow channels. The air flow is guided to corresponding discharge ports, such as at least one discharge port on a front window, in-dashboard discharge ports for directly blowing air to occupants, and discharge ports for blowing air to legroom, by an air distribution system which has various discharge control members and is disposed in the vehicle. Excess air is discharged to the outside through additional discharge ports from the housing of the compact air-conditioning system.

FR 2 743 027 A1 discloses an air conditioner for vehicles, which includes a conventional refrigerant circulation system having only an evaporator, a compressor, a condenser, and an expansion member. Heat exchangers are disposed within separate flow channels in the form of at least fluid separation. The flow channels have cross connections or bypasses. The air mass flows introduced by blowers are guided by the closing and opening of flaps and via the surfaces of the heat exchangers by passing through the bypasses according to operating modes if necessary. In this case, the air mass flows are cooled and/or dehumidified or heated, and are then discharged to a passenger compartment and/or to the outside.

DE 10 2011 052 752 A1 discloses a modular air conditioner for vehicles, which has a heat pump function for heating and cooling air. The air conditioner for vehicles includes a housing, which has a blower and flaps for adjusting air flow paths, and a refrigerant circulation system which has a condenser, an evaporator, an expansion member, and associated connection lines. An evaporator-air flow path with an integrated evaporator and a condenser-air flow path with an integrated condenser are formed in the housing. The two air flow paths are connected to each other through the controllable flaps such that a passenger compartment is heated and cooled only through the adjustment of the air flow paths.

DE 10 2012 108 891 A1 discloses an air-conditioning system for conditioning air in a passenger compartment. The air-conditioning system includes a housing having first and second flow channels for guiding air, and a refrigerant circulation system having an evaporator and a condenser. The evaporator is disposed in the first flow channel, and the condenser is disposed in the second flow channel. In this case, at least one heat exchanger, i.e. the evaporator or the condenser, from among the heat exchangers, is configured such that a portion of the heat transfer surface thereof is disposed in both the first flow channel and the second flow channel. The ratio of the heat transfer surface required for each operating mode may be adjusted in such a manner that air is supplied to the heat transfer surface by air guide devices.

The air-conditioning systems known in the related art are characterized in that air guided to the passenger compartment is mixed from various air flows to have a mixing temperature. As a result, air having a uniform temperature is supplied to the air distribution system disposed in the vehicle, and the flows of air introduced to the passenger compartment from all of the opened discharge ports is discharged at the same temperature. However, requirements for formation and operation of the air-conditioning systems are present in the vehicles. According to the requirements for formation and operation of the air-conditioning systems, in order to accomplish the temperature stratification of pleasant air so as to correspond to warm legroom (lower region) and a cold head region (upper region), air discharged from the discharge port of the dashboard for directly blowing air to occupants should be colder than air introduced into the legroom from the discharge port (thereof). Therefore, the temperatures of air flows discharged from individual discharge ports, in particular discharge ports which are provided in the dashboard and communicate with the legroom, may be individually adjusted. However, the individual temperature adjustment may not be realized by the flow rate of air discharged from all of discharge ports having a uniform temperature.

SUMMARY OF THE DISCLOSURE

Accordingly, the present invention has been made in view of the above-mentioned problem, and an object thereof is to provide an air side-controlled compact air-conditioning system that has a heat pump function for heating, cooling, and/or dehumidifying air, in particular for application to vehicles. In order to accomplish temperature stratification in an air distribution system or a passenger compartment and to provide flows of air, having a correspondingly adjusted temperature, to individual discharge ports in the passenger compartment by the air-conditioning system, the temperatures of the respective flows of air, passing through a large number of discharge ports communicating with the passenger compartment, must be adjusted. The air-conditioning system, in particular a refrigerant circulation system, should have only the minimum number of parts, and should be economically manufactured at low cost and have no defect.

In accordance with an aspect of the present invention, the above and other objects can be accomplished by the provision of an air-conditioning system for conditioning air in a vehicle passenger compartment. The air-conditioning system is configured to operate in a cooling system mode for cooling air to be supplied to the passenger compartment and in a heat pump mode for heating the same, and to operate in a reheating mode for reheating air to be supplied to the passenger compartment. The air-conditioning system includes a housing having a first flow channel and a second flow channel for guiding air to an air distribution system having discharge ports communicating with the passenger compartment, and a refrigerant circulation system having at least two heat exchangers. In this case, the first heat exchanger is disposed in the first flow channel, and the second heat exchanger is disposed in the second flow channel. The first heat exchanger is formed and operable as an evaporator for cooling and/or dehumidifying an air mass flow, regardless of operating modes, and the second heat exchanger is formed and operable as a condenser/gas cooler for heating an air mass flow, regardless of operating modes.

In the case where refrigerant such as R134a is used, when the refrigerant is liquefied under the subcritical operation of the refrigerant circulation system or the specific surrounding environment in which carbon dioxide is used, the heat exchanger is referred to as a condenser. Partial heat transfer is conducted at a certain temperature. During supercritical operation or supercritical heat dissipation in the heat exchanger, the temperature of refrigerant is uniformly reduced. In this case, the heat exchanger is referred to as a gas cooler. The supercritical operation may occur, for example in the specific surrounding environment or operating mode of the refrigerant circulation system in which carbon dioxide is used as refrigerant. The term "condenser" used in the following specification also means a gas cooler.

According to the concept of the present invention, at least one flow path is formed to directly introduce an air mass flow into the passenger compartment. The flow path extends to one discharge port, communicating with the passenger compartment for the air mass flow, from one of the heat exchangers so that the air mass flow is conditioned by the heat exchanger and is then immediately guided to the discharge port.

The expression "directly introducing air mass flow into passenger compartment" means that an air mass flow, which is guided to the flow path from the individual flow channel and then passes through the flow path communicating with the discharge port, is introduced into the passenger compartment from the discharge port, without mixing with other conditioned air mass flows, i.e. in the state in which it is not mixed therewith. Accordingly, the air mass flow guided to the discharge port through the flow path has a temperature different from the typical air mass flows guided to other discharge ports. The air-conditioning system is preferably configured such that different operating modes are adjusted only through the control of air guide devices.

According to a preferred embodiment of the present invention, the flow path for directly introducing an air mass flow into the passenger compartment is formed as a cold-air flow path. In this case, the cold-air flow path is a portion of the first flow channel and extends to the in-dashboard discharge port, for directly blowing air to an occupant in the passenger compartment, from a region that is formed next to the evaporator in the flow direction of air, so that the air mass flow is conditioned by the evaporator and is then immediately guided to the in-dashboard discharge port, and has a temperature different from air mass flows guided to the front window-side discharge port and the discharge port communicating with legroom.

According to an improvement of the present invention, the cold-air flow path has an air guide device to control the opening degree thereof. In this case, the air guide device is continuously adjustable between two end positions in a "fully closed state" and a "fully opened state". The positions of the air guide devices are preferably controlled by a controller.

According to another preferred embodiment of the present invention, the flow path for directly introducing an air mass flow into the passenger compartment is formed as a hot-air flow path. In this case, the hot-air flow path is a portion of the second flow channel and extends to the discharge port communicating with the passenger compartment from a region that is formed next to the condenser in the flow direction of air, so that the air mass flow is conditioned by the condenser and is then immediately guided to the discharge port communicating with legroom, and has a temperature different from air mass flows guided to the front window-side discharge port and the in-dashboard discharge port for directly blowing air to an occupant in the passenger compartment.

According to an improvement of the present invention, the hot-air flow path has an air guide device to control the opening degree thereof. In this case, the air guide device is continuously adjustable between two end positions in a "fully closed state" and a "fully opened state". The positions of the air guide devices are preferably controlled by a controller.

According to a preferred embodiment of the present invention, the condenser may be configured such that a portion of the heat transfer surface thereof is arranged in both the first flow channel and the second flow channel. In this case, the ratio of the heat transfer surface arranged in the second flow channel, the ratio being required for each operating mode in particular for the reheating mode, is adjustable in such a manner that air is supplied to the heat transfer surface by air guide devices. The air guide devices are arranged so as to be movable or fixable.

Preferably, the air mass flows, which are conditioned when excessively flowing in the first and/or second flow channel and the evaporator and/or condenser, may be immediately guided to the passenger compartment and/or to the air distribution system and/or to the outside of the vehicle through flow paths. In this case, the first flow channel is formed next to the evaporator in the flow direction of air in such a manner that the first flow channel is divided into a cold-air flow path, which has an air guide device and is connected to the air distribution system, a cold-air flow path, which has an air guide device for guiding an air mass flow to the outside, and the cold-air flow path, which has the air guide device for directly introducing an air mass flow into the passenger compartment. Therefore, the air mass flow conditioned through the first flow channel may be divided into partial air mass flows at the positions of the air guide devices. In this case, the first partial air mass flow is guidable through the cold-air flow path connected to the air distribution system, the second partial air mass flow is guidable through the cold-air flow path connected to the outside of the housing, and the third partial air mass flow is immediately guidable to the in-dashboard discharge port and is then guidable to the passenger compartment through the discharge port. The second flow channel is formed next to the condenser in the flow direction of air in such a manner that the second flow channel is divided into a hot-air flow path, which has an air guide device and is connected to the air distribution system, a hot-air flow path, which has an air guide device for guiding an air mass flow to the outside, and the hot-air flow path, which has the air guide device for directly introducing an air mass flow into the passenger compartment. Therefore, the air mass flow conditioned through the second flow channel may be divided into partial air mass flows at the positions of the air guide devices. In this case, the first partial air mass flow is guidable through the hot-air flow path connected to the air distribution system, the second partial air mass flow is guidable through the hot-air flow path connected to the outside of the housing, and the third partial air mass flow is immediately guidable to the discharge port communicating with legroom and is then guidable to the passenger compartment through the discharge port.

Flow channels are preferably formed so as to be supplied with fresh air introduced from the outside, recirculation air in the passenger compartment, or a mixture of the fresh air and the recirculation air. The flow channels are preferably arranged such that the main flow directions of air are therein aligned parallel to each other to be directed in one common direction. The directions of air mass flows, which are at least directed toward the passenger compartment, are actually equal to each other.

According to a further preferred embodiment of the present invention, at least one blower is provided, and the blower transfers an air mass flow through the air-conditioning system. According to an improvement of the present invention, two blowers are provided so as to be independently operable. In this case, the first blower transfers an air mass flow to the first flow channel, and the second blower transfers an air mass flow to the second flow channel.

In accordance with another aspect of the present invention, the above and other objects can be accomplished by the provision of a method of operating an air-conditioning system for conditioning air in a vehicle passenger compartment, for operating in both a cooling system mode and a heat pump mode for cooling and heating air in a vehicle passenger compartment and for operating in a reheating mode. The method includes the following steps of:
transferring at least two air mass flows in the housing of the air-conditioning system;
cooling and/or dehumidifying a first air mass flow when the first air mass flow excessively flows in the evaporator of the refrigerant circulation system;
dividing the cooled and/or dehumidified air mass flow into at least two partial cold-air mass flows, wherein the air mass flow is divided at a ratio of 0% to 100%, one partial cold-air mass flow is guided to the air distribution system in the passenger compartment, and the other partial cold-air mass flow is immediately guided to the in-dashboard discharge port through the cold-air flow path and is then guided to the passenger compartment;
heating a second air mass flow when the second air mass flow excessively flows in the condenser of the refrigerant circulation system, the second air mass flow being guided to the air distribution system in the passenger compartment;
mixing the cooled and/or dehumidified partial cold-air mass flow with the air mass flow heated by the air distribution system in the passenger compartment; and
introducing the air mass flows into the passenger compartment.

According to a preferred embodiment of the present invention, the first air mass flow, which is cooled and/or dehumidified when excessively flowing in the evaporator, is divided, at a ratio of 0% to 100%, into a partial air mass flow guided to the outside and an air mass flow divided into at least two additional partial cold-air mass flows.

In accordance with a further aspect of the present invention, the above and other objects can be accomplished by the provision of a method of operating an air-conditioning system for conditioning air in a vehicle passenger compartment, for operating in both a cooling system mode and a heat pump mode for cooling and heating air in a vehicle passenger compartment and for operating in a reheating mode. The method includes the following steps of:
transferring at least two air mass flows in the housing of the air-conditioning system;
cooling and/or dehumidifying a first air mass flow when the first air mass flow excessively flows in the evaporator of the refrigerant circulation system, the air mass flow being guided to the air distribution system in the passenger compartment;
heating a second air mass flow when the second air mass flow excessively flows in the condenser of the refrigerant circulation system;
dividing the heated air mass flow into at least two partial hot-air mass flows, wherein the air mass flow is divided at a ratio of 0% to 100%, one partial hot-air mass flow is guided to the air distribution system in the passenger compartment, and the other partial hot-air mass flow is immediately guided to the discharge port communicating with legroom through the hot-air flow path and is then guided to the passenger compartment;
mixing the heated partial hot-air mass flow with the air mass flow cooled and/or dehumidified by the air distribution system in the passenger compartment; and
introducing the air mass flows into the passenger compartment.

According to a preferred embodiment of the present invention, the second air mass flow, which is heated when excessively flowing in the condenser, is divided, at a ratio of 0% to 100%, into a partial air mass flow guided to the outside and an air mass flow divided into at least two additional partial hot-air mass flows.

Consequently, the present invention has the following additional advantages:
individually adjustable temperatures to be suitable for a large number of discharge ports for desired temperature stratification in a vehicle passenger compartment, and thus increased and individually adjustable comfort for occupants;

an increase in efficiency during the operation of an air-conditioning system, the increase in efficiency being possible by the following:

cooling air flow through a specific discharge port, in particular an in-dashboard discharge port for directly blowing air to occupants, so as to be suitable for the purpose, and simultaneously providing a temperature required for the flow of warm air during operation in a heat pump mode through another specific discharge port, in particular a discharge port communicating with legroom; and/or heating air flow through a specific discharge port, in particular a discharge port communicating with legroom, so as to be suitable for the purpose, and simultaneously providing a temperature required for the flow of cold air through another specific discharge port, in particular an in-dashboard discharge port for directly blowing air to occupants; and a reduction in output required to increase the temperature in the passenger compartment through air flow rate regulation suitable for the purpose in flow channels.

BRIEF DESCRIPTION OF DRAWINGS

The above and other objects, features and other advantages of the present invention will be more clearly understood from the following detailed description taken in conjunction with the accompanying drawings, a compact air-conditioning system being illustrated in the drawings, in which:

FIG. 2B is a view illustrating the air-conditioning system of FIG. 2A, having an additional cold-air flow path extending between the evaporator and an in-dashboard discharge port for direct introduction of air, and an air distribution system in the passenger compartment; and FIG. 3 is a view illustrating the air-conditioning system of FIGS. 1A to 1C, having an additional hot-air flow path extending between the condenser and a discharge port communicating with the passenger compartment for directly introducing and guiding heated air to the passenger compartment, and an air distribution system in the passenger compartment.

BEST MODE FOR INVENTION

Figure 1A:
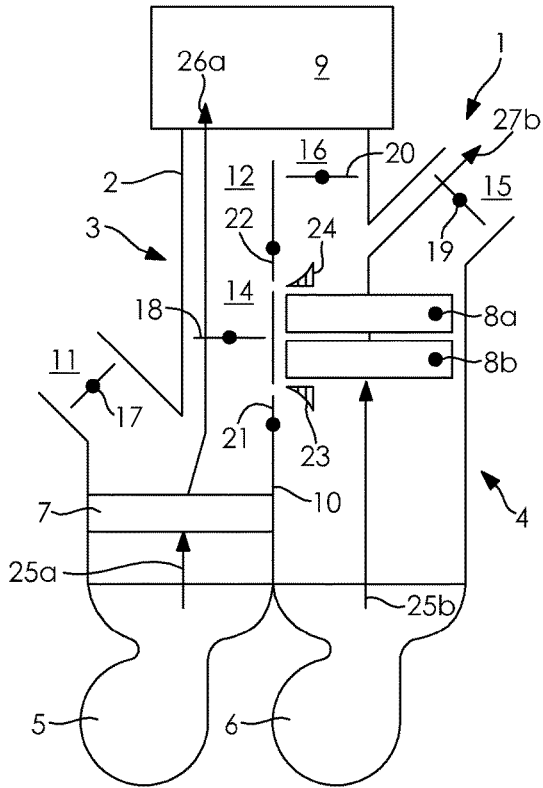
FIG. 1A to 1C are views illustrating an air-conditioning system having two flow channels, air guide devices, an evaporator, and a condenser during operation in different operating modes.
Figure 1B:
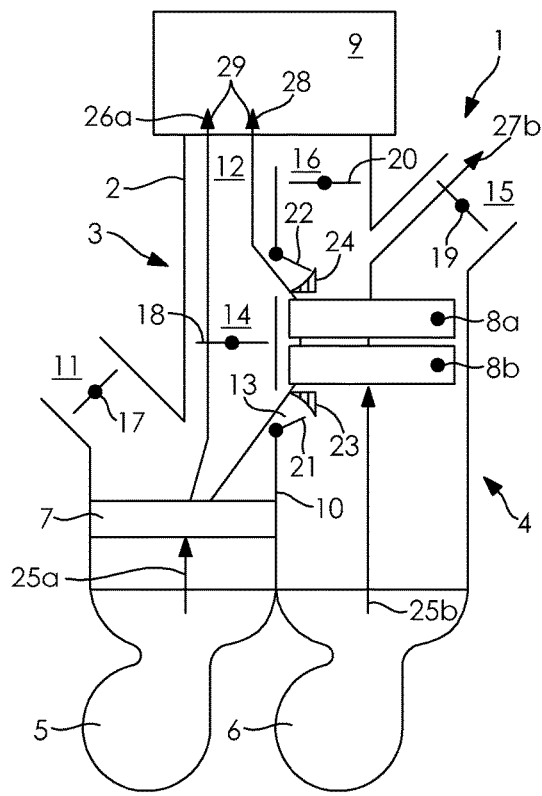
Figure 1C:
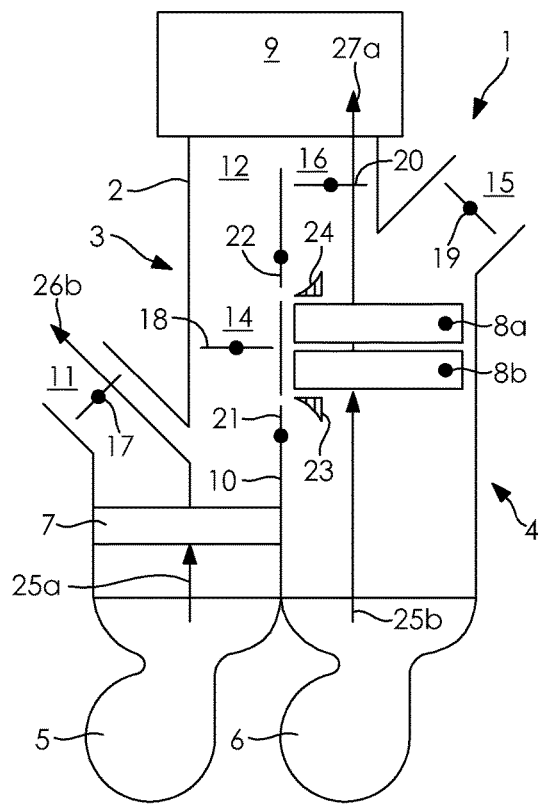

FIG. 1A to 1C illustrate an air-conditioning system 1 according to the related art, which includes a housing 2 having a first flow channel 3 and a second flow channel 4. In this case, blowers 5 and 6 are assigned to the respective flow channels 3 and 4, and fresh air introduced from the outside, a recirculation air in a passenger compartment 9, or a mixture thereof may be supplied to the channels. FIG. 1A illustrates the air-conditioning system 1 during operation in a cooling system mode, FIG. 1B illustrates the air-conditioning system 1 during operation in a reheating mode, and FIG. 1C illustrates the air-conditioning system 1 during operation in a heat pump mode.

An evaporator 7 is disposed in the first flow channel 3, and a condenser 8a and 8b is disposed in the second flow channel 4. In this case, both are parts of a refrigerant circulation system (not shown) of the air-conditioning system 1, and are formed as heat exchangers to which air is supplied. The condenser may consist of a single part, or may consist of two separated parts as illustrated in the drawings. In this case, the evaporator 7 occupies the flow cross-section of the first flow channel 3. The condenser 8a and 8b is arranged so as to overlap with the flow channels, and has two regions. The first region is arranged in the second flow channel 4 so as to cover the overall flow cross-section, and has a higher heat transfer surface than the second region. The second region of the condenser 8a and 8b may be arranged in the first flow channel 3 or in the second flow channel 4, as needed and depending on the operating mode of the air-conditioning system 1. In this case, the second region of the condenser 8a and 8b may be arranged in a flow path 13 of the first flow channel 1 (particularly, illustrated in FIG. 1B), and the second region may occupy the overall flow cross-section of the flow path 13, the size of which is variable.

The first and second flow channels 3 and 4 are separated from each other by a partition wall 10, two additional air guide devices 21 and 22 as movable flaps, and stationary air guide devices 23 and 24 as air baffles. The matched air guide devices 21 and 22, and the air baffles 23 and 24, which are aligned parallel to the partition wall 10 in the cooling system mode of FIGS. 1A and 1n the heat pump mode of FIG. 1C, form air guide devices for the condenser 8a and 8b. The air guide devices 21 and 22 and the air baffles 23 and 24 serve to prevent the air mass flow in the first flow channel 3 and the air mass flow in the second flow channel 4, which are cooled and conditioned when the air flows through the evaporator 7, from mixing with each other. The air baffles 23 and 24, which protrude into the second flow channel 4 and are distant from the partition wall 10, each have an increased length. The more the air baffles 23 and 24 are distant from the partition wall 10, the greater the respective length of each of the air baffles 23 and 24. In this case, the lengths of the air baffles 23 and 24 increase in such a manner that the overall arrangement ends of the air baffles 23 and 24 form two recessed surfaces. The surfaces are curved respectively in the same manner to draw circular arcs about the axes aligned parallel to the surfaces. The centers of the circular arcs refer to axes, respectively, and the rectangular surfaces are curved about the axes. In this case, the axes correspond to the rotary axes of the movable air guide devices 21 and 22. The radii of the surfaces, which are curved in the form of circular arc, correspond to the longitudinal extension parts of the air guide devices 21 and 22. That is, the radii of the surfaces correspond to the extension parts of the movable air guide devices 21 and 22 in the direction of the mass flows of air passing through the flow channels 3 and 4.

The pivotable air guide devices 21 and 22 are aligned such that the side edges thereof, which are distant from the rotary axes and face each other, are concavely curved and directed toward surfaces that stretch from the ends of the air baffles 23 and 24. For free movement of the air guide devices 21 and 22, a gap having a minimum width is present between the side edge of each of the air guide devices 21 and 22 and the associated surface. The gap has no influence on or has a slight influence on the mass flow of air. The air guide devices 21 and 22 simultaneously rotate about the respective rotary axes in opposite directions, thereby enabling the ratio between the regions of the condenser 8a and 8b to be adjusted in the first and second flow channels 3 and 4. In this case, the regions of the condenser 8a and 8b may be continuously divided. In order to the air mass flow to flow along the sequential flow surface, the air guide devices 21 and 22 rotates, and are then aligned such that the side edges thereof, which are parallel to the rotary axes and are distant therefrom to face each other, face the ends of the air baffles 23 and 24. The leakage flow, which occurs at the intermediate positions of the air guide devices 21 and 22 relative to the air baffles 23 and 24, is negligible. The intermediate positions mean positions of the air guide devices 21 and 22 in which the side edges of the air guide devices 21 and 22 do not exactly face the edges of the air baffles 23 and 24, but rather are disposed between both air baffles 23 and 24.

Air mass flows having different rates are supplied to the first flow channel 3 with the evaporator 7 and the second flow channel 4 with the condenser 8a and 8b, and the first and second flow channels enable the air mass flows to rapidly respond to the changed operating conditions. Therefore, the individually adjustable blowers 5 and 6 bring about the advantageous dynamics of the air-conditioning system 1. The blower 5 in the first flow channel 3 guides air, which is introduced in a flow direction 25a, as an air mass flow, to the evaporator 7. The air mass flow is cooled and/or dehumidified when excessively flowing in the evaporator 7. The cold-air mass flow discharged from the evaporator 7 is divided, at a required ratio, into a partial air mass flow, which flows to the outside through a cold-air flow path 11 referred to as an exhaust channel 11 in a flow direction 26b, and a partial air mass flow, which flows to the passenger compartment 9 through a cold-air flow path 12 in a flow direction 26a, or is entirely assigned to one 11 or 12 of the cold-air flow paths. The cold-air mass flow is divided by air guide devices 17 and 18 as flaps.

Similar to the blower 5, the blower 6 sucks air in a flow direction 25b and then guides the sucked air, as an air mass flow, to the condenser 8a and 8b. The air mass flow is heated when excessively flowing in the condenser 8a and 8b. The hot-air mass flow discharged from the condenser 8a and 8b is divided, at a required ratio, into a partial air mass flow, which flows to the outside through a hot-air flow path 15 in a flow direction 27b, and a partial air mass flow, which flows to the passenger compartment 9 through a hot-air flow path 16 in a flow direction 27a, or is entirely assigned to one 15 or 16 of the hot-air flow paths. The hot-air mass flow is divided by air guide devices 19 and 20 as flaps.

When the air-conditioning system 1 operates in the cooling system mode, i.e. when the air-conditioning system 1 cools air to be supplied to the passenger compartment 9, as illustrated in FIG. 1A, the air guide device 18 is opened. The air guide devices 21 and 22 are aligned in a manner that is flush with the partition wall 10 so as to close a flow path 13 (see FIG. 1B) extending through the region of the condenser 8a and 8b. As a result, the entirety of air mass flow passes and flows by the condenser 8a and 8b in the flow direction 26a while the cold-air flow path 11 is closed, and is guided to the passenger compartment 9 through the cold-air flow path 12. The air mass flow passing through the first flow channel 3 is a bypass flow, and is guided through a bypass channel 14 which bypasses the condenser 8a and 8b. The air guide devices 19 and 20 are aligned such that the air mass flow is guided to the outside through the hot-air flow path 15 in the flow direction 27b while the hot-air flow path 16 leading to the passenger compartment 9 is closed. The blower 5 transfers air to the evaporator 7 through the first flow channel 3 in the flow direction 25a. The air is cooled and dehumidified, and then flows to the passenger compartment 9 through the cold-air flow path 12 in the flow direction 26a. The blower 6 transfers air to the condenser 8a and 8b in the flow direction 25b in the second flow channel 4. The air is heated, and then flows to the outside through the hot-air flow path 15 in the flow direction 27b.

When the air-conditioning system 1 operates in the heat pump mode, i.e. when the air-conditioning system 1 heats air to be supplied to the passenger compartment 9, as illustrated in FIG. 1C, the air guide devices 17 and 20 are opened. As a result, the air mass flow transferred through the first flow channel 3 is guided to the outside through the cold-air flow path 11 in the flow direction 26b, while the bypass channel 14 is closed by the air guide device 18. The air guide devices 21 and 22 are aligned in a manner that is flush with the partition wall 10, with the consequence that the flow path 13 is also closed. The air mass flow transferred through the second flow channel 4 is guided to the passenger compartment 9 through the hot-air flow path 16 in the flow direction 27a, while the hot-air flow path 15 is closed by the air guide device 19. The blower 5 transfers air to the evaporator 7 through the first flow channel 3 in the flow direction 25a. The air is cooled, and then flows to outside through the cold-air flow path 11 in the flow direction 26b. The blower 6 transfers air to the condenser 8a and 8b through the second flow channel 4 in the flow direction 25b. The air is heated, and then reaches the passenger compartment 9 through the hot-air flow path 16 in the flow direction 27a.

When the air-conditioning system 1 operates in the reheating mode, i.e. when the air-conditioning system 1 cools and/or dehumidifies and reheats air to be supplied to the passenger compartment 9, as illustrated in FIG. 1B, the air guide devices 17, 18, 19, 20, 21, and 22 are arranged at different positions in a fully opened state and a fully closed state, as needed. The positions of the air guide devices 17, 18, 21, and 22, and the air mass flow to be heated by the rotational speed of the blower 5 are changed. The region of the condenser 8a and 8b, which is arranged in the flow path 13, is preferentially usable during operation in the reheating mode.

The air guide devices 21 and 22 are aligned such that the flow path 13 extending through the region of the condenser 8a and 8b is opened. As a result, the air mass flow, which flows through the first flow channel 3 and is a first partial air mass flow, passes by the condenser 8a and 8b in the flow direction 26a, and is then guided to the cold-air flow path 12 through the bypass channel 14, while a second partial air mass flow is reheated when excessively flowing in the region of the condenser 8a and 8b. Although the cold-air flow path 11 is closed, it may be opened in an alternative operating mode (not shown). Consequently, the air mass flow, which is guided through the first flow channel 3 and is the first partial air mass flow/bypass flow, is guided through the bypass channel 14 which bypasses the condenser 8a and 8b, and the second partial air mass flow is guided through the flow path 13 in a flow direction 28, and is then reheated. When the air guide devices 18, 21, and 22 are opened, the partial air mass flow, which is reheated when excessively flowing in the condenser 8a and 8b, is mixed with a partial air mass flow of the cold-air mass flow in the cold-air flow path 12. The partial air mass flow passing through the first flow channel 3 may be adjusted through the adjustment of the air guide device 17, the power supply of the blower 5, and the rotational speed of the blower 5. When the air guide device 17 is opened, the partial air mass flow passing through the first flow channel 3 is reduced depending on the position of the air guide device 17. The first partial air mass flow having a cold-air mass flow temperature and the heated second partial air mass flow are mixed in the cold-air flow path 12 to be an air mass flow having the same temperature, and the air mass flow is supplied to the passenger compartment 9 in a flow direction 29.

When the air guide device 18 is closed, the air mass flow, which is reheated when excessively flowing in the condenser 8a and 8b, is guided to the passenger compartment 9 in the state in which it is not mixed. Moreover, the partial cold-air mass flow, which is conditioned when excessively flowing in the evaporator 7, may be guided to the outside through the air guide device 17 and the cold-air flow path 11 which are opened.

The air guide devices 19 and 20 are aligned such that the air mass flow is guided to the outside through the hot-air flow path 15 in the flow direction 27b while the hot-air flow path 16 leading to the passenger compartment 9 is closed. The blower 5 transfers air to the evaporator 7 through the first flow channel 3 in the flow direction 25a. After the air is cooled and dehumidified, it is divided into two partial air mass flows. The partial air mass flows flow to the cold-air flow path 12 through the bypass channel 14 and the flow path 13 in the flow direction 26a, and are mixed so as to flow to the passenger compartment 9. The blower 6 transfers air to the condenser 8a and 8b in the flow direction 25b in the second flow channel 4. The air is heated, and then flows to the outside through the hot-air flow path 15 in the flow direction 27b.

The two pairs of flaps 17 and 18, and 19 and 20 are each connected by one dynamic device, and may be adjusted by a single drive device. Alternatively, the air guide devices 17 and 18, and 19 and 20 as flaps may consist of a single flap.

Figure 2A:
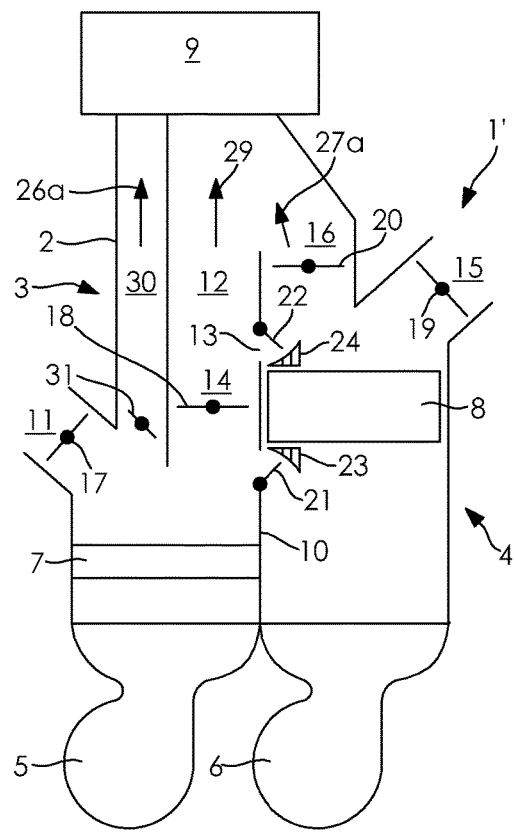
FIG. 2A is a view illustrating the air-conditioning system of FIGS. 1A to 1C, having an additional cold-air flow path for directly introducing and guiding cooled and/or dehumidified air to a passenger compartment.

FIG. 2A illustrates a compact air-conditioning system 1' having two flow channels 3 and 4, air guide devices 17, 18, 19, 20, 21, 22, 23, and 24, an evaporator 7, and a condenser 8. In this case, the air-conditioning system 1' basically corresponds to the air-conditioning system 1 illustrated in FIGS. 1A to 1C, in terms of functions and configurations. The air-conditioning system 1' illustrated in FIG. 2A differs from the air-conditioning system 1 illustrated in FIGS. 1A to 1C in that an additional cold-air flow path 30 is a portion of the first flow channel 3 and extends to a passenger compartment 9 from a region that is formed next to the evaporator 7 in the flow direction of air. Therefore, at least portion of the air mass flow, which is cooled and/or dehumidified when excessively flowing in the evaporator 7, may be immediately guided to the passenger compartment 9 on a flow path leading to the passenger compartment 9, without mixing with an air mass flow having a different temperature.

An air channel, which is formed to directly introduce the cold-air flow path 30 to the passenger compartment 9, leads to the region of the first flow channel 3 behind the evaporator 7 in the flow direction, in the same manner as the cold-air flow path 11 for guiding air to the outside of the housing 2 and the bypass channel 14 for guiding air to the cold-air flow path 12. The air mass flow guided through the cold-air flow path 30 is preferably controlled by the position of an air guide device 31 as a flap. In this case, the air guide device may be continuously adjusted between two end positions in a "fully closed state" and a "fully opened state".

FIG. 2B illustrates the air-conditioning system 1' of FIG. 2A, having an air distribution system or an air distribution housing 32' disposed in the passenger compartment 9. The air distribution system 32' includes a large number of air discharge ports such as a front window-side discharge port 33, a discharge port communicating with legroom 34, and an in-dashboard discharge port 35 for directly blowing air to occupants in the passenger compartment 9. In this case, the cold-air flow path 30 for direct introduction of air into the passenger compartment 9 is connected to the air distribution system 32' in the passenger compartment 9, and extends to the in-dashboard discharge port 35 from the region of the evaporator 7 disposed in the first flow channel 3. As a result, the cooled and/or dehumidified air may be immediately guided to occupants in the passenger compartment 9 in the state in which it is not mixed. Accordingly, colder air may be supplied to the in-dashboard discharge port 35, compared to the other discharge ports 33 and 34, so as to be suitable for the purpose, with the consequence that the air temperature at the discharge port 35 may be especially adjusted on demand.

The air mass flow, which is conditioned through the flow path 12 and/or the flow path 16 depending on the operating mode while being parallel to the cold-air mass flow introduced into the passenger compartment 9 through the in-dashboard discharge port 35, may be guided at a higher temperature than the cold-air mass flow, for example, through the front window-side discharge port 33 or the discharge port communicating with legroom 34. As a result, desired temperature stratification is generated in the passenger compartment 9. In this case, an air temperature is set to be lower at the in-dashboard discharge port 35 rather than the discharge port communicating with legroom 34. This is ensured by the cold-air flow path 30 in which the temperature stratification is further arranged, and the cold-air flow path 30 is therefore referred to as a stratification path.

The air mass flow conditioned through the first flow channel 3 may be divided, at a ratio of 0% to 100%, into partial air mass flows at the positions of the air guide device 17 in the cold-air flow path 11, the air guide device 18 in the bypass channel 14, and the air guide device 31 in the cold-air flow path 30, after the evaporator 7, in the flow direction of air. In this case, the first partial air mass flow may be guided out of the housing 2 through the cold-air flow path 11. The second partial air mass flow may be guided to the cold-air flow path 12 through the bypass channel 14 and/or the flow path 13, and then be guided to the passenger compartment 9. The third partial air mass flow may pass through the cold-air flow path 30, and then be immediately guided to the passenger compartment 9, in particular the in-dashboard discharge port 35.

FIG. 3 illustrates a compact air-conditioning system 1" having two flow channels 3 and 4, air guide devices 17, 18, 19, 20, 21, 22, 23, and 24, an evaporator 7, and a condenser 8. In this case, the air-conditioning system 1" basically corresponds to the air-conditioning system 1 illustrated in FIGS. 1A to 1C, in terms of functions and configurations. The air-conditioning system 1" illustrated in FIG. 3 differs from the air-conditioning system 1 illustrated in FIGS. 1A to 1C in that an additional hot-air flow path 36 is a portion of the second flow channel 3 and extends to a passenger compartment 9 from a region that is formed next to the condenser 8 in the flow direction of air. Therefore, at least portion of the air mass flow, which is heated when excessively flowing in the condenser 8, may be immediately guided to the passenger compartment 9 on a flow path leading to the passenger compartment 9, without mixing with an air mass flow having a different temperature.

An air channel, which is formed to directly introduce the hot-air flow path 36 to the passenger compartment 9, leads to the region of the second flow channel 4 behind the condenser 8 in the flow direction, in the same manner as the hot-air flow path 15 for guiding air to the outside of the housing 2 and the hot-air flow path 16 for guiding air to an air distribution system 32". The air mass flow guided through the hot-air flow path 36 is preferably controlled by the position of an air guide device 37 as a flap. In this case, the air guide device may be continuously adjusted between two end positions in a "fully closed state" and a "fully opened state".

The air distribution system or air distribution housing 32" includes a large number of air discharge ports such as a front window-side discharge port 33, a discharge port communicating with legroom 34, and an in-dashboard discharge port 35 for directly blowing air to occupants in the passenger compartment 9. In this case, the hot-air flow path 36 for direct introduction of air into the passenger compartment 9 is connected to the air distribution system 32" in the passenger compartment 9, and extends to the discharge port communicating with legroom 34 from the region of the condenser 8 disposed in the second flow channel 4. As a result, the heated air may be immediately guided to the legroom in the passenger compartment 9 in the state in which it is not mixed. Accordingly, warmer air may be supplied to the discharge port communicating with legroom 34, compared to the other discharge ports 33 and 35, so as to be suitable for the purpose, with the consequence that the air temperature at the discharge port 34 may be especially adjusted on demand.

The air mass flow, which is conditioned through the flow path 12 and/or the flow path 16 depending on the operating mode while being parallel to the hot-air mass flow introduced into the passenger compartment 9 through the discharge port communicating with legroom 34, may be guided at a lower temperature than the hot-air mass flow, for example, through the front window-side discharge port 33 or the in-dashboard discharge port 35. As a result, desired temperature stratification is generated in the passenger compartment 9. In this case, an air temperature is set to be higher at the discharge port communicating with legroom 34 rather than the in-dashboard discharge port 35. This is ensured by the hot-air flow path 36 in which the temperature stratification is further arranged, and the hot-air flow path 36 is therefore referred to as a stratification path.

The air mass flow conditioned through the second flow channel 4 may be divided, at a ratio of 0% to 100%, into partial air mass flows at the positions of the air guide device 19 in the hot-air flow path 15, the air guide device 20 in the hot-air flow path 16, and the air guide device 37 in the hot-air flow path 36, after the condenser 8, in the flow direction of air. In this case, the first partial air mass flow may be guided out of the housing 2 through the hot-air flow path 15. The second partial air mass flow may pass through the hot-air flow path 16, and then be guided to the passenger compartment 9. The third partial air mass flow may pass through the hot-air flow path 36, and then be immediately guided to the passenger compartment 9, in particular the discharge port communicating with legroom 34.

DESCRIPTION OF REFERENCE NUMERALS

1: air-conditioning system
1', 1": air-conditioning system for temperature stratification in passenger compartment
2: housing
3: first flow channel
4: second flow channel
5, 6: blower
7: evaporator
8, 8a, 8b: condenser/gas cooler
9: passenger compartment
10: partition wall
11: cold-air flow path, exhaust channel
12: cold-air flow path
13: flow path in first flow channel (3)
14: bypass channel in first flow channel (3)
15: hot-air flow path, exhaust channel
16: hot-air flow path
17: air guide device/flap in cold-air flow path (11)
18: air guide device/flap in bypass channel (14)
19: air guide device/flap in hot-air flow path (15)
20: air guide device/flap in hot-air flow path (16)
21, 22: air guide device/flap between flow channels (3, 4) for inflow and outflow in inlet/outlet of condenser (8a, 8b)-flow path (13)
23, 24: stationary air guide device, air baffle
25a, 25b: flow direction of sucked air
26a, 26b: flow direction of cold air
27a, 27b: flow direction of hot air
28: flow direction of dehumidified hot-air
29: flow direction of mixture of dehumidified hot-air and cold-air
30: cold-air flow path for direct introduction of air into passenger compartment (9)
31: air guide device/flap in cold-air flow path (30)
32', 32": air distribution system or air distribution housing
33: front window-side discharge port
34: legroom discharge port
35: in-dashboard discharge port
36: hot-air flow path for direct introduction of air into passenger compartment (9)
37: air guide device/flap in hot-air flow path (36)

The invention claimed is:

1. A method of operating an air-conditioning system for operating in both a cooling system mode and a heat pump mode for cooling and heating air in a passenger compartment of a vehicle and for operating in a reheating mode, the method comprising steps of:
   transferring at least two air mass flows in a housing of the air-conditioning system, further including an air-distribution housing in the passenger compartment including at least an in-dashboard discharge port;
   cooling or dehumidifying a first one of the at least two air mass flows as the first one of the at least two air mass flows is conveyed through an evaporator of a refrigerant circulation system;
   dividing the first one of the at least two air mass flows into at least two partial cold-air mass flows, a first one of the at least two partial cold-air mass flows is guided to the air distribution housing upstream of the in-dashboard discharge port in the passenger compartment, and a second one of the at least two partial cold-air mass flows is directly guided to the in-dashboard discharge port through a cold-air flow path and then guided to the passenger compartment downstream of the in-dashboard discharge port;
   heating a second one of the at least two air mass flows as the second one of the at least two air mass flows is conveyed through a condenser gas/cooler of the refrigerant circulation system, the second one of the at least two air mass flows guided to the air distribution housing upstream of the in-dashboard discharge port;
   mixing the first one of the at least two partial cold-air mass flows with the second one of the at least two air mass flows guided to the air distribution housing upstream of the in-dashboard discharge port in the air-distribution housing to form a mixed flow stream; and introducing the mixed flow stream into the passenger compartment downstream of the in-dashboard discharge port through the in-dashboard discharge port, the first one of the at least two partial cold-air mass flows and the mixed flow stream guided through the in-dashboard discharge port simultaneously.

2. A method of operating an air-conditioning system for operating in both a cooling system mode and a heat pump mode for cooling and heating air in a passenger compartment of a vehicle and for operating in a reheating mode, the method comprising steps of:
    transferring at least two air mass flows in a housing of the air-conditioning system further including an air distribution housing in the passenger compartment including at least a discharge port communicating with legroom;
    cooling or dehumidifying a first one of the at least two air mass flows as the first one of the at least two air mass flows is conveyed through an evaporator of a refrigerant circulation system, the first one of the at least two air mass flows guided to an air distribution housing in the passenger compartment upstream of the discharge port communicating with legroom;
    heating a second one of the at least two air mass flows as the second one of the at least two air mass flows is conveyed through a condenser/gas cooler of the refrigerant circulation system;
    dividing the second one of the at least two air mass flows into at least two partial hot-air mass flows, a first one of the at least two partial hot-air mass flows is guided to the air distribution housing upstream of the discharge port communicating with legroom in the passenger compartment and a second one of the at least two partial hot-air mass flows is directly guided to the discharge port communicating with legroom through a hot-air flow path and then guided to the passenger compartment downstream of the discharge port communicating with legroom;
    mixing the first one of the at least two partial hot-air mass flows with the first one of the at least two air mass flows guided to the air distribution housing upstream of the discharge port communicating with legroom to form a mixed flow stream; and
    introducing the mixed flow stream into the passenger compartment downstream of the discharge port communicating with legroom through the discharge port communicating with legroom, the second one of the at least two partial hot-air mass flows and the mixed flow stream guided through the discharge port communicating with legroom simultaneously.

3. An air-conditioning system for conditioning air in a passenger compartment of a vehicle, the air-conditioning system configured to operate in a cooling system mode for cooling the air to be supplied to the passenger compartment and in a heat pump mode for heating the air to be supplied to the passenger compartment, and to operate in a reheating mode, the air-conditioning system comprising:
    a housing having a first flow channel and a second flow channel guiding the air to an air distribution housing in the passenger compartment having discharge ports communicating with the passenger compartment downstream of the air distribution housing; and
    a refrigerant circulation system having at least two heat exchangers, wherein a first one of the heat exchangers is disposed in the first flow channel, a second one of the heat exchangers is disposed in the second flow channel, the first one of the heat exchangers formed and operable as an evaporator regardless of an operating mode, and the second one of the heat exchangers is formed and operable as a condenser/gas cooler regardless of the operating mode, wherein a first flow path and a second flow path are formed in a same one of the first flow channel and the second flow channel, each of the first flow path and the second flow path extending to a same one of the discharge ports from the first one of the heat exchangers or the second one of the heat exchangers, wherein the first flow path is separately formed from the second flow path, wherein the system is further configured such that a first air mass flow is configured to flow through one of the first flow channel and the first one of the heat exchangers or through the second flow channel and the second one of the heat exchangers and such that a second air mass flow is configured to flow through the other of the first flow channel and the first one of the heat exchangers or the second flow channel and the second one of the heat exchangers, wherein the first flow path is configured to receive a first partial air mass flow from the first air mass flow and convey the first partial air mass flow from the one of the first one of the heat exchangers or the second one of the heat exchangers directly into the passenger compartment downstream of the discharge ports through the one of the discharge ports, wherein the second flow path is configured to receive a second partial air mass flow from the first air mass flow and convey the second partial air mass flow from the one of the first one of the heat exchangers or the second one of the heat exchangers to the air distribution housing upstream of the discharge ports where the second partial air mass flow is mixed with the second air mass flow to form a mixed air mass flow, the mixed air mass flow conveyed into the passenger compartment downstream of the discharge ports through the one of the discharge ports, and wherein the first partial air mass flow and the mixed air mass flow are configured to simultaneously flow through the one of the discharge ports to the passenger compartment.

4. The air-conditioning system according to claim 3, wherein the first flow path is formed in the first flow channel and is configured to guide the first partial air mass flow from directly downstream of the evaporator in a flow direction of the air to the one of the discharge ports, and wherein the one of the discharge ports is an in-dashboard port and a temperature of the first partial air mass flow is different from a temperature of the mixed air mass flow.

5. The air-conditioning system according to claim 4, wherein the first flow path has an air guide device to control an opening degree of the first flow path, and wherein the air guide device is continuously adjustable between two end positions of a "fully closed state" and a "fully opened state".

6. The air-conditioning system according to claim 3, wherein the first flow path is formed in the second flow channel and is configured to guide the first partial air mass flow from directly downstream of the condenser/gas cooler in a flow direction of the air to the one of the discharge ports, and wherein the one of the discharge ports is a discharge port communicating with legroom and a temperature of the first partial air mass flow is different from a temperature of the mixed air mass flow.

7. The air-conditioning system according to claim 6, wherein the first flow path has an air guide device to control an opening degree of the first flow path, and wherein the air guide device is continuously adjustable between two end positions in a "fully closed state" and a "fully opened state".

8. The air-conditioning system according to claim 3, wherein the first air mass flow flows through the evaporator, wherein the first flow channel includes the first flow path, the second flow path, and an exhaust channel, the exhaust channel configured to receive a third partial air mass flow from the first air mass flow and convey the third partial air mass flow from the evaporator to outside of the housing, wherein the first flow path includes a first air guide device, the second flow path includes a second air guide device, and the exhaust channel includes a third air guide device, and wherein the air mass flow is divided into the first partial air mass flow at the first air guide device, the second partial air mass flow at the second air guide device, and the third partial air mass flow at the third air guide device.

9. The air-conditioning system according to claim 3, wherein the first air mass flow flows through the condenser/gas cooler wherein the second flow channel includes the first flow path, the second flow path, and an exhaust channel, the exhaust channel configured to receive a third partial air mass flow from the first air mass flow and convey the third partial air mass flow from the condenser/gas cooler to outside of the housing, wherein the first flow path includes a first air guide device, the second flow path includes a second air guide device, and the exhaust channel includes a third air guide device, and wherein the air mass flow is divided into the first partial air mass flow at the first air guide device, the second partial air mass flow at the second air guide device, and the third partial air mass flow at the third air guide device.

* * * * *